W. T. SPROUSE.
Plow.
No. 604.
Patented Feb. 15, 1838.
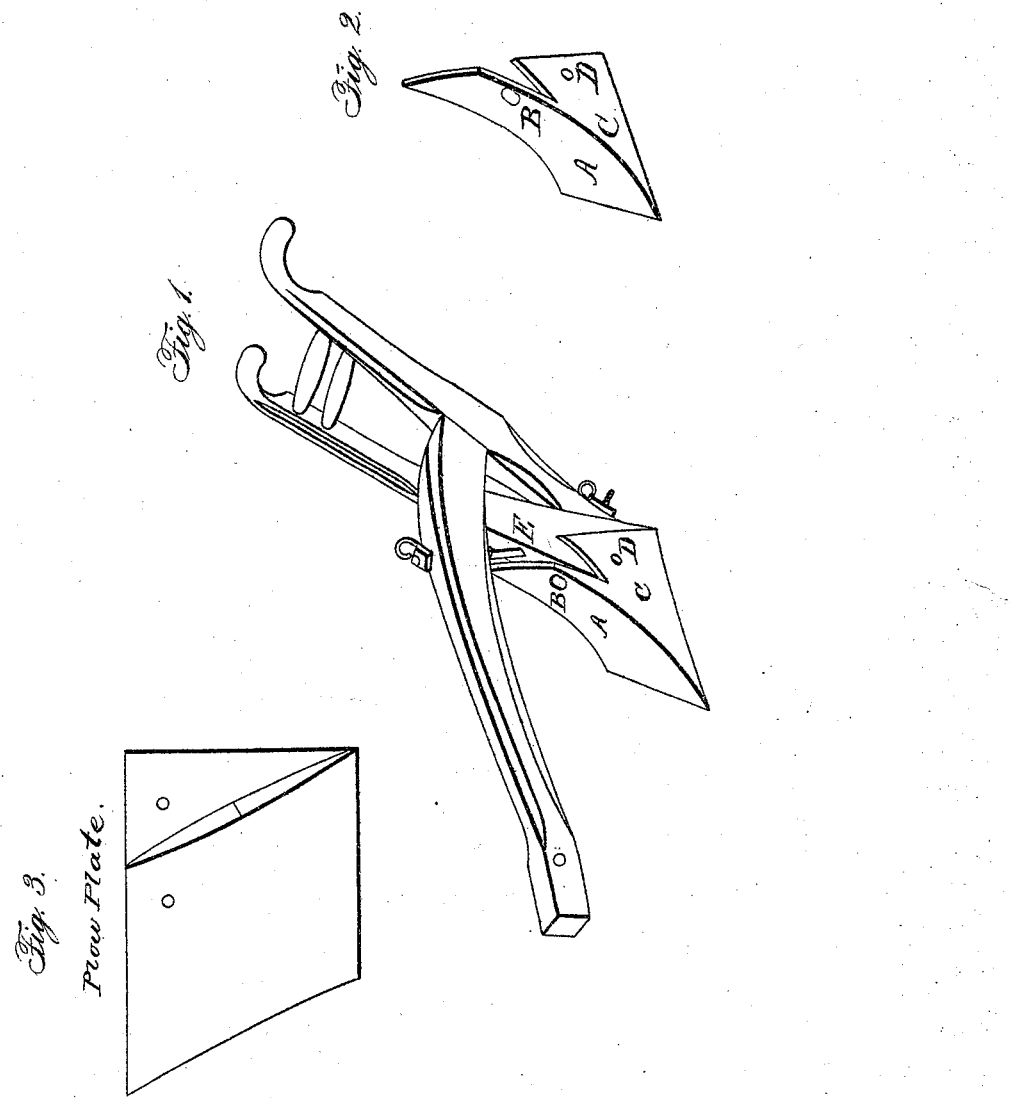

UNITED STATES PATENT OFFICE.

WILLIAMS T. SPROUSE, OF SANGAMON, ILLINOIS.

IMPROVEMENT IN PLOWS.

Specification forming part of Letters Patent No. 604, dated February 15, 1838.

*To all whom it may concern:*

Be it known that I, WILLIAMS T. SPROUSE, of the county of Sangamon and State of Illinois, have discovered a new and useful Improvement in the Manufacture of Plows; and I do hereby declare that the following is a full and exact description of said improvement and of the process of making the same.

The improved plow is called "Sprouse's plow," and differs from all other plows in the manner as well of making the irons as of stocking them, the mold-board and bar being made out of a single piece of iron without welding, thus: Take a plow-plate, square at one end and of the proper dimensions—say twelve (12) inches broad, the upper edge eighteen (18) inches, and the lower edge or share twelve (12) inches long. Draw a diagonal line across said plate from a point on the upper edge thereof six (6) inches from the square and twelve (12) inches from the sharp end of said upper edge to the square end of the lower edge of said plate, leaving the said plate on one side of said line in the shape of a diamond and on the other side of a half-square. Cut through the plate on this line, one-half the distance thereof, commencing on the upper edge of said plate. Make a half-inch hole through said plate, on each side of said diagonal line, about one and a half inch from the upper edge of the plate. Bend the smaller part of the plate—to wit, that in the shape of a half-square, detached, as aforesaid—by cutting, over into the proper position for the bar. Give the larger—*i. e.* the diamond-shaped—part of the plate a gradual bend for a mold-board, and the irons are completed.

The stock is made upon the same principle that stocks of other plows are made, consisting of a sheth and two handles.

The plow is stocked thus: The sheth E is placed under the mold, and is attached to the bar and mold respectively by bolts passing through the holes directed to be made in said bar and mold, the bolt through the bar being extended through the sheth and fastened by a tap, and that through the mold extending also through and attaching the left-hand handle to the sheth, and thus being fastened by a tap. The right-hand handle is attached to the sheth by a staple.

What I, the said WILLIAMS T. SPROUSE, claim as my own invention, and not previously known, in the above-described improvement in the manufacture of plows, is—

The making of the mold and bar out of a single piece of iron by cutting and bending instead of making them out of two pieces of iron and welding them together.

Springfield, November 30, 1836.

WILLIAMS T. SPROUSE.

In presence of—
 JESSE B. THOMAS, Jr.,
 JAMES BARKINSON.